(12) United States Patent
Light et al.

(10) Patent No.: US 6,206,639 B1
(45) Date of Patent: Mar. 27, 2001

(54) ENHANCED FAN AND FAN DRIVE ASSEMBLY

(75) Inventors: Gerard M. Light, Sao Jose dos Campos (BR); James R. DeBrabander, Birch Run, MI (US); Neil E. Robb, Jackson, MI (US); Donald E. Buckley, Lansing, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/257,112

(22) Filed: Feb. 25, 1999

(51) Int. Cl.$^7$ ................................................. F04D 29/58
(52) U.S. Cl. .................. 416/169 A; 416/170 R; 416/244 R; 416/214 R; 192/58.682; 192/113.24
(58) Field of Search .......................... 416/169 A, 169 R, 416/170 R, 244 R, 214 R; 123/41.12, 41.11, 41.49; 192/58.682, 58.68, 58.5, 113.24

(56) References Cited

U.S. PATENT DOCUMENTS

| 4,169,693 | 10/1979 | Brubaker .......................... 416/93 R |
| 4,384,824 | 5/1983 | Woods ............................. 416/169 A |
| 4,487,551 | * 12/1984 | Mizutani et al. .................. 416/135 |
| 4,678,070 | 7/1987 | Light ............................... 192/58 B |

FOREIGN PATENT DOCUMENTS

| 0350585 | 1/1990 | (EP) . |
| 14 10677 | 12/1965 | (FR) . |
| 1576736 | 10/1980 | (GB) . |
| 02087047 | 5/1982 | (GB) . |
| 58-149426 | 12/1983 | (JP) . |

* cited by examiner

Primary Examiner—Edward K. Look
Assistant Examiner—Rhonda Barton
(74) Attorney, Agent, or Firm—Baker & Daniels; Greg Dziegielewski

(57) ABSTRACT

A fan drive assembly including a cooling fan (11) and a fluid coupling device (13). The cooling fan includes a fan hub (17), a spider (15), and a plurality of fan blades (19). The coupling device has an output coupling assembly (21) including a body (23) and a cover (25). The body (23) includes preferably only three mounting portions (67), each being disposed immediately adjacent an outer periphery of the body. Each of the mounting portions (67) defines the necessary machining chucking surfaces (73), and a spider mounting surface (75) including a pilot surface (77) engaging the pilot diameter (79) of the spider (15). The body (23) includes cooling fins (61) covering substantially all of the rearward surface (59) of the body not covered by the mounting portions. The fan hub (17) also includes a rearwardly extending air dam portion (81), limiting localized radial air flow. The present invention is able to improve the radial air flow through the body cooling fins and achieve substantially greater heat dissipation from the fan drive assembly, thus permitting greater fan speed for a given input speed.

8 Claims, 6 Drawing Sheets

*INVENTION*

ENHANCED FAN AND FAN DRIVE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to fan drive assemblies of the type including a cooling fan and a fan drive, and more particularly, to such fan drive assemblies wherein the fan drive is of the type in which heat is generated as a result of the transmission of torque within the fan drive, and the ability of the fan drive to dissipate such generated heat represents a limiting factor on the torque transmitting capability of the fan drive assembly.

Although the present invention may be used with various types and configurations of torque transmitting fan drives, it is especially adapted for use with fan drive assemblies of the type including a viscous fluid coupling device as the fan drive, and will be described in connection therewith.

Fan drive assemblies of the type which may benefit from the use of the present invention have found several uses, one of the most common of which is in connection with cooling the radiator of a vehicle engine. As is well known to those skilled in the art, the fan drive of the typical fan drive assembly comprises a viscous fluid coupling device, so named because the coupling utilizes a high viscosity fluid to transmit torque, by means of viscous shear drag, from an input coupling member (clutch) to an output coupling member (housing), with the cooling fan being bolted, or otherwise suitably attached, to the output coupling member.

The present invention is especially advantageous when used on a relatively high horsepower fan drive assembly, i.e., one which is capable of transmitting somewhere in the range of about two to about twelve horsepower from the fan drive to the cooling fan. Typically, such high horsepower fan drives include an output coupling member of the type which comprises a cast aluminum body and a cast aluminum cover. The input coupling member is typically also made as a cast aluminum member, and cooperates with the body and/or the cover to define a plurality of interdigitated lands and grooves which define the viscous shear space. When the shear space is filled with viscous fluid, typically a silicon fluid, torque is transmitted from the input coupling member to the output coupling assembly, in response to the rotation of the input coupling member.

During such torque transmission, substantial heat is generated as a result of the shearing of the viscous fluid between the lands and grooves. The amount of heat generated is generally proportional to the "slip speed" of the fan drive, i.e., the difference between the speed of the input and the speed of the output. It is generally well understood by those skilled in the art that the ability to transmit torque is limited by the ability of the device to dissipate the heat generated. For example, in a viscous fan drive, if the temperature of the viscous fluid exceeds a certain maximum temperature, the result will be a deterioration of the viscous properties of the fluid, resulting in a gradual loss of the torque transmitting capability of the fluid.

In the fan drive art, it has been conventional for the design and development of a particular cooling fan to occur generally independently of the design and development of the viscous fan drive with which the fan is to be utilized. In other words, the fan is designed to provide the desired operating parameters (e.g., torque, air flow, etc.), thus determining the blade configuration and spacing, and then the mounting portion of the fan (the "spider") is designed or merely modified to adapt to the configuration of the particular fan drive mounting arrangement (e.g., mounting pads or bosses, disposed at a particular diameter from the axis of the fan drive).

What has not been conventional in the fan drive art is to design the cooling fan and the fan drive as a "package", with the goal of maximizing the heat dissipation of the overall fan drive assembly. As a result, it would appear that, at the time of the present invention, there is no commercially available fan drive assembly which achieves nearly its optimum, potential heat dissipation (heat rejection). As a further result, practically every fan drive assembly in commercial use is larger and more expensive than is actually necessary, in order to achieve a particular, desired flow of cooling air through the radiator.

Although the present invention is not limited to a fan drive assembly in which the fan is mounted to the rearward side of the housing (body), rather than being mounted to the cover, the invention is especially advantageous in such an arrangement, and will be described in connection therewith. A typical "rear mount" fan drive is illustrated and described in U.S. Pat. No. 4,384,824, in which the body member includes four mounting bosses located radially inward of the body cooling fins. As a result, the fan spider interferes with the radial flow of cooling air through the body cooling fins, thus reducing the heat dissipation capability of the particular fan drive assembly.

BRIEF SUMMARY OF THE INVENTION

Accordingly, it is an object of the present invention to provide an improved fan drive assembly in which the cooling fan and the fluid coupling device driving the fan are designed such that the overall assembly approaches the optimum, potential heat dissipation.

It is a more specific object of the present invention to provide an improved fan drive assembly in which the cooling fan is mounted to the body (housing) of the fluid coupling device in a manner which substantially improves the flow of air through the housing cooling fins.

It is a related object of the present invention to provide an improved fan drive assembly which accomplishes the above-stated objects, and in which the cooling fan is configured to further improve the flow of air through the housing cooling fins.

It is another object of the present invention to provide an improved fan drive assembly which accomplishes the above-stated objects, and in which the cover cooling fins are configured to improve the flow of air through the cover cooling fins.

The above and other objects of the invention are accomplished by the provision of a fan drive assembly of the type comprising a cooling fan attached to a fluid coupling device, the cooling fan comprising a fan hub, a spider portion, and a plurality of fan blades extending radially from the fan hub. The fluid coupling device comprises a first rotatable coupling assembly including a body member having a rearward surface, and a cover member cooperating with the body member to define a fluid chamber therebetween, a second rotatable coupling member being disposed in the fluid chamber for rotation relative to the first coupling assembly. The first coupling assembly and the second coupling member cooperate to define a viscous shear chamber therebetween, whereby torque may be transmitted from the second coupling member to the first coupling assembly in response to the presence of viscous fluid in the shear chamber. The body member includes a plurality of cooling fins and a plurality of mounting portions, the spider portion being attached to the mounting portions and defining a pilot diameter.

The improved fan drive assembly is characterized by the body member including a plurality of mounting portions, each of which is disposed immediately adjacent an outer periphery of the body member. Each of the mounting portions defines a machining chucking surface, and a spider mounting surface on a rearward face thereof. The spider mounting surface includes a pilot surface in engagement with the pilot diameter of the spider portion. The plurality of cooling fins covers substantially all of the rearward surface of the body member not covered by the mounting portions.

In accordance with another aspect of the present invention, the fan hub and each of the plurality of fan blades cooperate to define a rearward axially extending air dam portion operable to restrict localized radial air flow.

DETAILED DESCRIPTION OF THE PREFERRED EMBODIMENT

Figure 1:
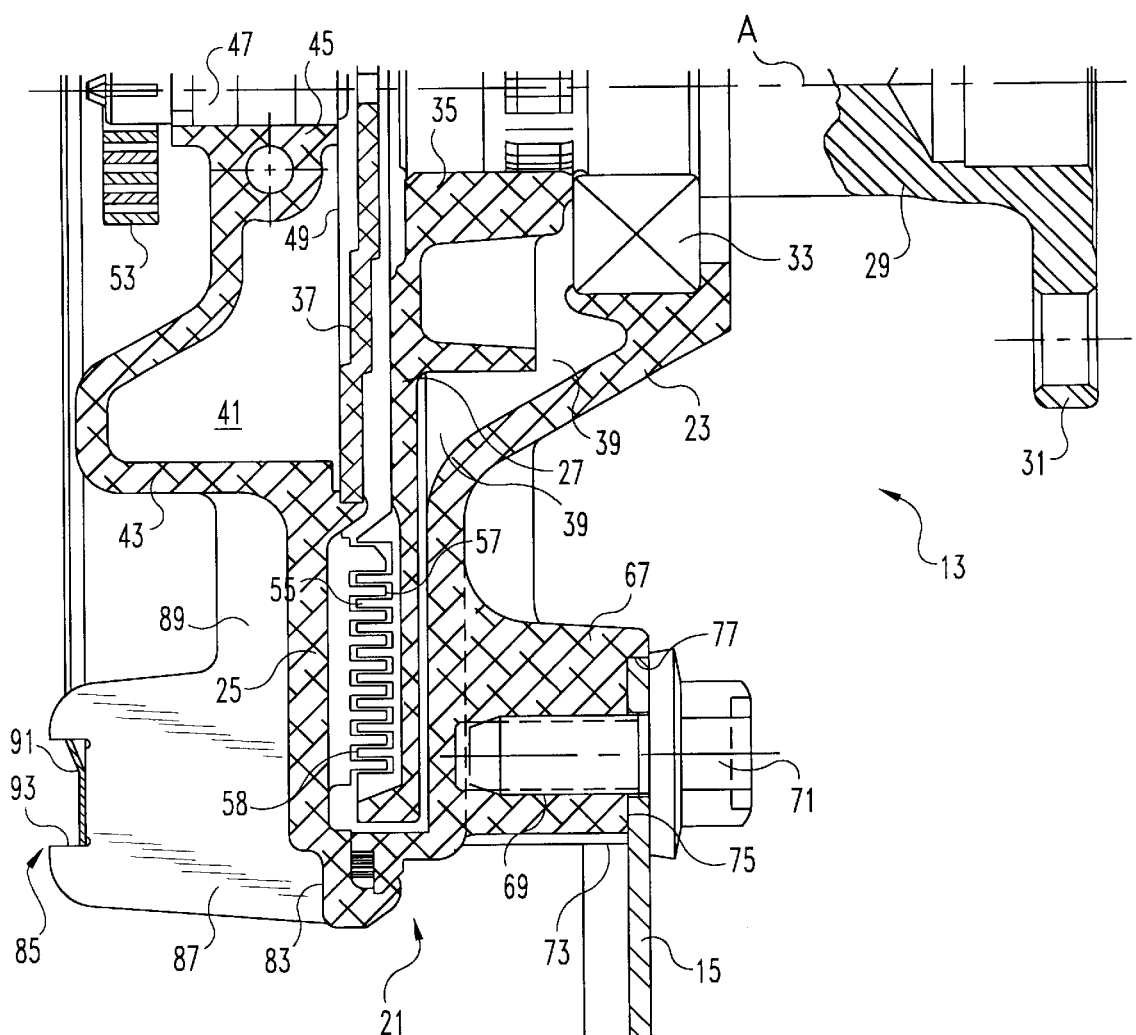
FIG. 1 is an axial cross-section of one-half of the fan drive assembly of the present invention, taken on line 1—1 of FIG. 3, but on a larger scale than FIG. 3, and including the cooling fan.
Figure 1:
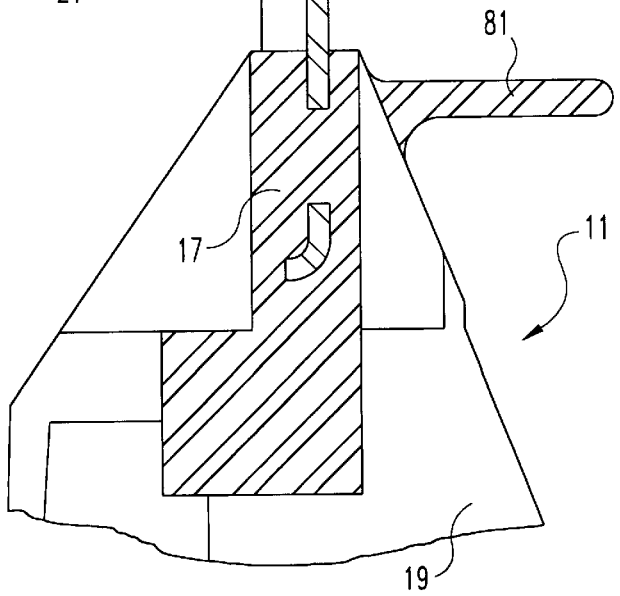
Figure 2:
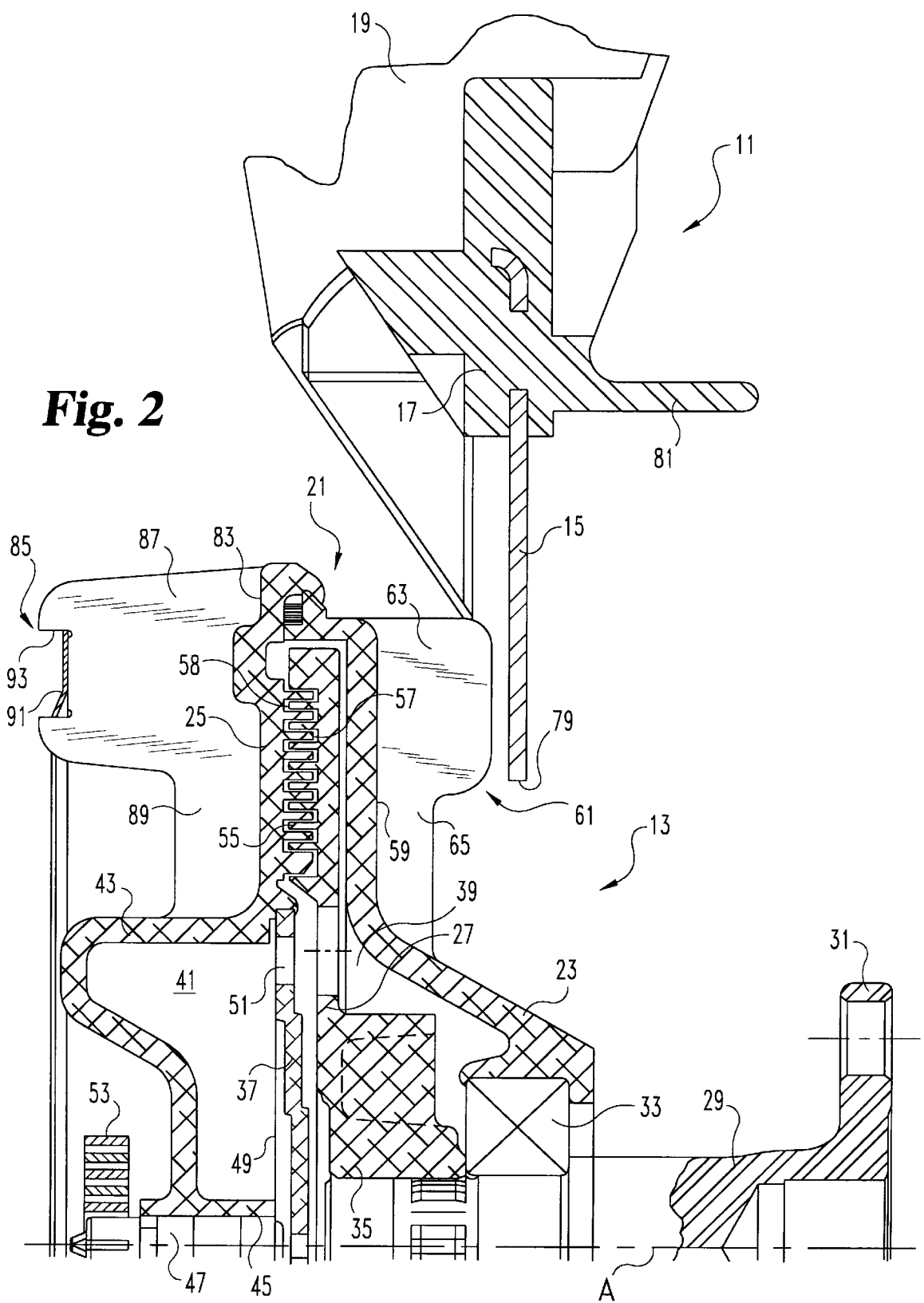
FIG. 2 is an axial cross-section of one-half of the fan drive assembly of the present invention, taken on line 2—2 of FIG. 3, and on the same scale as FIG. 1, but also including the cooling fan.

Referring now to the drawings, which are not intended to limit the invention, FIGS. 1 and 2 illustrate one preferred form of a fan drive assembly made in accordance with the present invention. The fan drive assembly comprises a cooling fan, generally designated 11, and a fluid coupling device, generally designated 13, the function of which is to provide drive torque to the cooling fan 11.

The cooling fan 11 may, within the scope of the present invention, have various configurations and constructions, and the invention is not limited to the particular construction shown, except as is specifically noted otherwise hereinafter. The cooling fan 11 comprises a stamped annular metal spider 15, which is usually a relatively thin, flat, sheet-like member. Preferably, an annular plastic hub portion 17 is molded about the outer periphery of the spider 15. However, the use of terms like "spider" and "hub" should not be construed as implying structural limitations. For example, within the scope of the present invention, the spider 15 could be molded integrally with the hub portion 17. Typically, there is a plurality of fan blades 19 molded integrally with the hub portion 17, the fan blades 19 being shown only fragmentarily in FIGS. 1 and 2. It should be understood that the particular arrangement and configuration of the fan blades 19 also does not constitute an essential aspect of the invention. As a further example, the fan 11 may be of either the "ring fan" type, in which an annular ring surrounds the outer tips of the fan blades 19, or the "open fan" type, in which no ring surrounds the fan blades. Other details of the cooling fan 11 will be described subsequently.

The fluid coupling device 13 typically includes an output coupling assembly 21 including a diecast aluminum housing (body) member 23, and a diecast aluminum cover member 25. Typically, the body 23 and cover 25 are secured together such as by a rollover of the outer periphery of the cover 25. However, in some coupling devices, the body and the cover are bolted together.

The body 23 and cover 25 cooperate to define a fluid chamber, and disposed therein is an input coupling member 27. As is well known in the art, the fluid coupling device 13 is adapted to be driven by a liquid cooled engine (not shown). The device includes an input shaft 29 on which the input coupling member 27 is mounted. The input shaft 29 is rotatably driven, typically by means of a flange 31 which may be bolted to the mating flange of an engine water pump (also not shown). The input shaft 29 functions as a support for the inner race of a bearing set 33, which is seated on the inside diameter of the body 23. The forward end (left end in FIGS. 1 and 2) of the input shaft 29 has an interference fit between a serrated portion and an opening defined by a hub portion 35 of the input coupling member 27. As a result, rotation of the input shaft 29 causes rotation of the input coupling member 27.

The body 23 and the cover 25 cooperate to define a fluid chamber, as mentioned previously, which is separated, by means of a circular valve plate 37 into a fluid operating chamber 39 and a fluid reservoir chamber 41. Thus, it may be seen that the input coupling member 27 is disposed within the fluid operating chamber 39.

The cover 25 defines a raised, annular reservoir-defining portion 43, which is disposed to be generally concentric about an axis of rotation A of the device. The cover 25 further defines a generally cylindrical shaft support portion 45, and rotatably disposed within the shaft support portion 45 is a valve shaft 47, extending outwardly (to the left in FIGS. 1 and 2) through the cover 25. Attached to the inner end (the right end in FIGS. 1 and 2) of the valve shaft 47 is a valve arm 49. Movement of the valve arm 49 controls the flow of fluid from the reservoir chamber 41 to the operating chamber 39 through a fill opening (port) 51 formed in the valve plate 37, and shown only in FIG. 2.

Operatively associated with the outer end of the valve shaft 47 is a temperature-responsive bimetal element, which in the subject embodiment, and by way of example only, comprises a coil member 53. The manner in which the bimetal coil 53 operates to control the movement of the valve arm 49, in response to variations in ambient air temperature, is well known in the art, forms no part of the present invention, and will not be described further herein.

Although not shown herein in either FIG. 1 or FIG. 2, it is typical, and well known to those skilled in the art, for the cover 25 to define fluid passages communicating from the outer periphery of the operating chamber 39 back to the reservoir chamber 41. Typically, the cover 25 would be provided with a wiper element (also not shown herein) whereby fluid would be pumped from the operating chamber 39, through the fluid passages and back into the reservoir chamber 41, in response to relative rotation between the input coupling member 27 and the cover 25. This pump (scavenge) function is also well known in the art, forms no direct part of the present invention, and will not be described further herein.

In the subject embodiment, and by way of example only, the input coupling member 27 includes a forward surface which defines a plurality of annular lands 55. The adjacent surface of the cover 25 forms a plurality of annular lands 57. The annular lands 55 and 57 are interdigitated to define a serpentine-shaped viscous shear chamber therebetween. The operation of the fluid coupling device 13 may be better understood by reference to U.S. Pat. No. 4,974,712, assigned to the assignee of the present invention and incorporated herein by reference. Briefly, when torque is transmitted from the vehicle engine by means of the input shaft 29 to the input coupling member 27, the result is a shearing of the viscous fluid contained in the shear space between the annular lands 55 and 57, the shear space also being referred to hereinafter by the reference numeral 58.

Referring still to FIGS. 1 and 2, but now also to FIGS. 3 and 4, one aspect of the present invention will be described. The body 23 defines a rearward surface 59 (shown best in FIGS. 2 and 3). The cast body 23 also includes a plurality of cooling fins, generally designated 61 and preferably cast integrally with the body 23, the fins 61 extending axially rearward (to the right in FIGS. 1 and 2). Each of the cooling fins 61 includes a radially outer fin portion 63 and a radially inner fin portion 65, it being understood that, as may best be seen in FIG. 3, the fin portions 63 and 65 together comprise a single, integral fin, and the primary difference between the portions 63 and 65 is that the outer fin portion 63 has an axial height H1 (measured from the rearward surface 59) and the inner fin portion 65 has an axial height H2, as may best be seen in FIG. 4.

Figure 3:
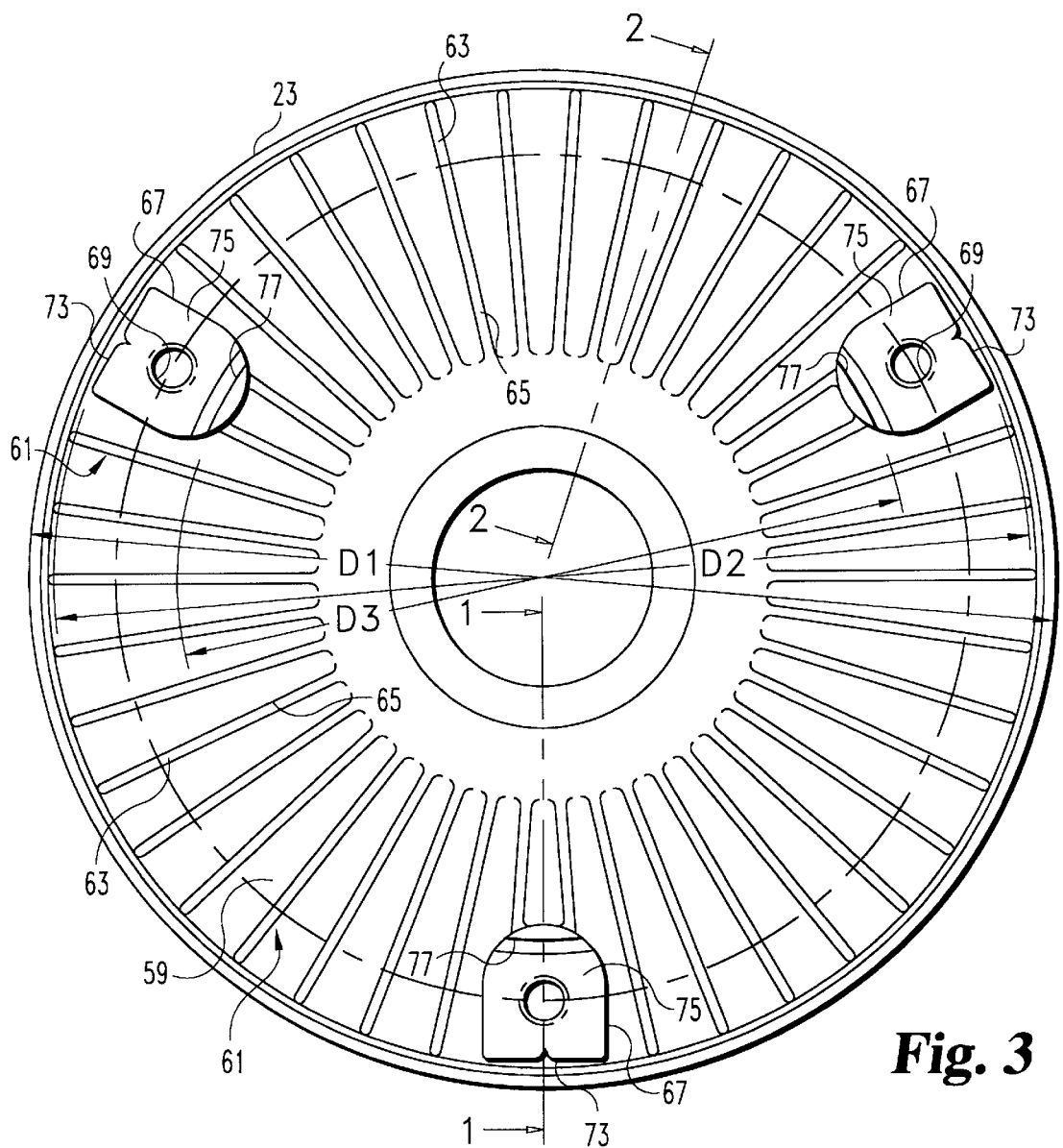
FIG. 3 is a plane view, looking toward the left in FIGS. 1 and 2, showing only the body member of the fluid coupling device which comprises part of the present invention.

Referring now primarily to FIGS. 1 and 3, the body 23 also includes a plurality of mounting portions or bosses 67. Each boss 67 defines an internally threaded bore 69, by means of which the metal spider 15 may be attached to the respective boss 67, preferably by means of a bolt 71. Reference is made hereinafter, and in the appended claims, to a "plurality" of the mounting portions 67. Preferably, there are only three of the mounting portions, for reasons of improved heat dissipation, as will become apparent from the subsequent description. However, in some applications of the present invention, especially when using relatively high torque fans, it may be necessary to utilize four of the mounting portions 67, and it should be clearly understood that either alternative is within the scope of the invention.

Referring still primarily to FIGS. 1 and 3, each of the mounting bosses 67 is disposed immediately adjacent the outer periphery of the body 23, which as is best shown in FIG. 3, has an outside diameter D1. Each mounting boss 67 includes, on its outer periphery, a machining chucking surface 73, illustrated herein, by way of example only, as being a substantially flat surface, including a small notched portion oriented parallel to the axis A of the coupling device 13. As is well known to those skilled in the art, the chucking surfaces 73 are included to permit the body 23 to be chucked, or held stationary, while the various surfaces and diameters are machined. It should be understood that the purpose of the invention is still accomplished if the chucking surfaces are disposed on the radially inner portion of each of the mounting bosses 67. In the subject embodiment, the three machining chucking surfaces 73 define a diameter D2, which is preferably at least 90–95% of the diameter D1. It has been conventional in the viscous fluid coupling art, in which the cooling fan is to be mounted relative to the body, for the body to include three chucking portions and three or four fan mounting bosses. In other words, there would be a total of six or seven different structural elements on the rearward surface of the body which would represent a discontinuation of, or an interference with, the presence of cooling fins and the radial flow of cooling air over the rearward surface of the body.

It is one important aspect of the present invention to recognize the importance of the radial flow of cooling air over the body 23 as a factor in the overall heat dissipation capability of the fan drive assembly. Therefore, as one important structural feature of the present invention, the functions of machining chucking and fan mounting have been combined into a single structure. Each of the mounting bosses 67 also includes a flat, transverse spider mounting surface 75, against which a forward surface of the spider 15 is disposed, and a generally annular pilot surface 77. As the name implies, the function of the pilot surface 77 is to "pilot" or to locate accurately an inside pilot diameter 79 (see FIGS. 2 and 4) of the spider 15. The pilot surfaces 77 define a diameter D3, and in the course of the development of the present invention, it has been determined that heat dissipation is maximized whenever the diameter D3 is in the range of about 53% to about 83% of the diameter D1. In the subject embodiment, and by way of example only, the diameter D3 is about 72% of the diameter D1.

In accordance with another important aspect of the present invention, and as may best be seen in FIG. 3, the mounting portions 67 and the various surfaces 73, 75, and 77 are made as small as possible, consistent with the function they are to perform, with substantially all of the remainder of the rearward surface 59 being covered by the cooling fins 61. Those skilled in the art will understand that the rearward surface 59 refers to the generally transverse surface radially outward of the generally frusto-conical portion of the body 23 which surrounds the bearing set 33. Thus, it may be seen that, in terms of the mounting portions 67 and cooling fins 61, it is possible for air to flow radially over nearly all of the rearward surface 59 of the body 23, thus maximizing the area on the rearward surface 59 which is actually available to achieve heat dissipation.

Figure 4:
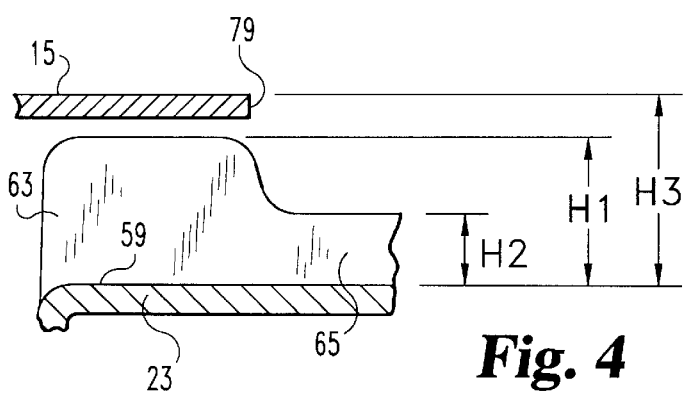
FIG. 4 is a somewhat schematic, fragmentary view of a portion of the body member and fan spider, illustrating one aspect of the present invention.

Referring now primarily to FIGS. 2, 3 and 4, another important aspect of the present invention relates to the outer and inner fin portions 63 and 65. As may best be seen in FIG. 2, and as is generally well known to those skilled in the viscous fluid coupling art, the heat generation within the viscous shear space 58 is greater toward the radially outer extent, and less toward the radially inner extent. Therefore, the outer fin portions 63, having the axial height H1 as described previously, have a radial extent which corresponds approximately to the region of greatest heat generation, and therefore, the region of the greatest need for heat dissipation. Radially inward from the fin portions 63, the inner fin portions 65, having the axial height H2, have substantially less heat dissipation capability than do the fin portions 63. However, the inner fin portions 65 are radially aligned with a region in which substantially less heat is generated, and therefore, less heat dissipation is required. In addition, it has been determined, in connection with the development of the present invention, that the relatively reduced axial height of the fin portions 65 has one further advantage, to be described subsequently.

Figure 5B:
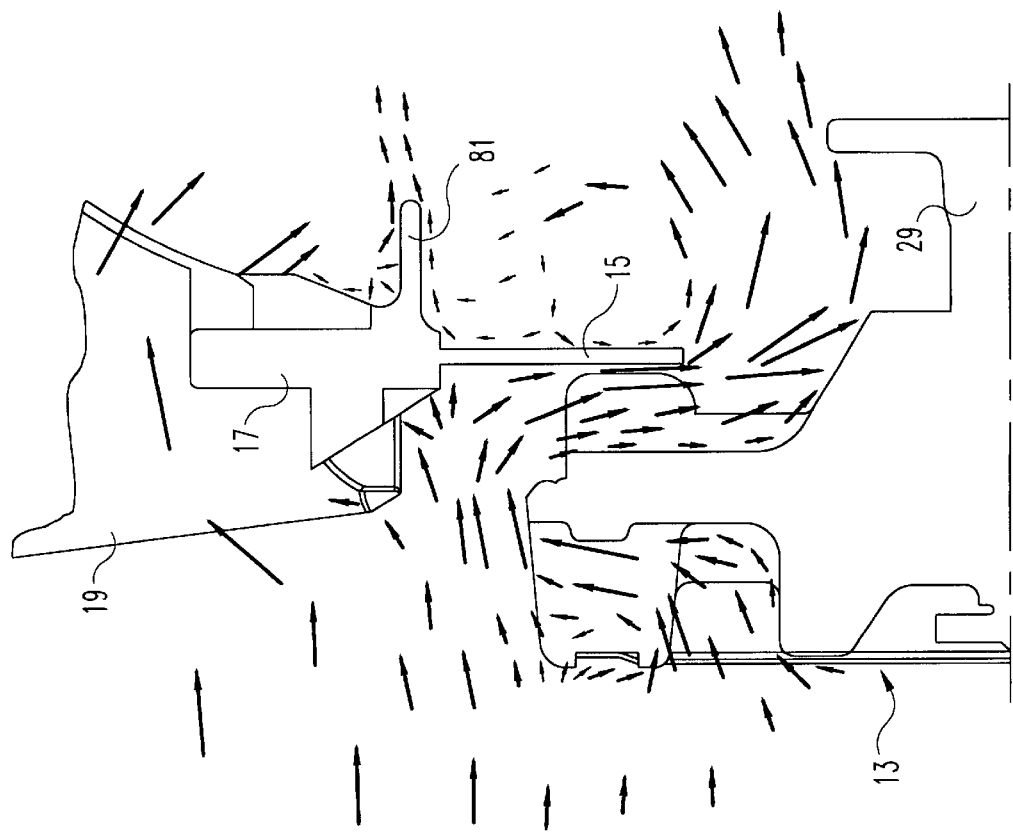
FIGS. 5A and 5B are somewhat schematic, fragmentary views, similar to FIG. 4, illustrating the flow of cooling air over the body, comparing the "PRIOR ART" and the "INVENTION", respectively.
Figure 5A:
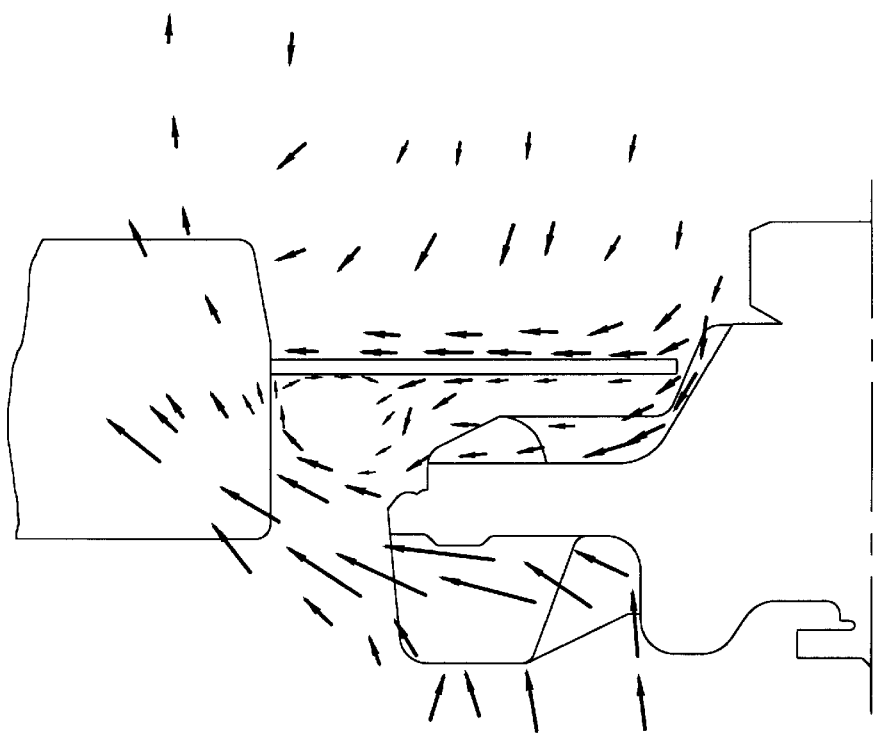

Referring now primarily to FIGS. 5A and 5B, which are air flow diagrams, it should be understood that the length of each of the arrows indicates flow velocity, i.e., the shorter arrows representing relatively lower velocities, and the longer arrows representing relatively higher velocities. FIGS. 5A and 5B were generated using well known and widely accepted CFD (computational fluid dynamics) analysis techniques. In FIG. 5A, the PRIOR ART, with the spider extending almost as far in radially as the frusto-conical portion of the body, actually has radially outward air flow through the region of the cooling fins on the body. However, it may be seen that the air flow velocity is not especially high, and the overall heat dissipation by the PRIOR ART assembly reflects the relatively poorer air flow through the body fins.

As may best be seen in FIGS. 2 and 4, the radial extent, inwardly, of the outer fin portions 63 corresponds approximately to the radially inner extent of the spider 15. Therefore, and as may best be seen in FIG. 5B, having the spider 15 disposed axially adjacent the radially outer fin portions 63 serves to direct or constrain air flow radially inward through the fin portions 63, to maximize heat transfer from the fin portions 63, as may be seen by the air flow velocity arrows through the body cooling fins. After flowing radially inward through the fin portions 63, some of the air then flows radially inward through the inner fin portions 65, and then is deflected axially, while some of the air exiting the outer fin portions 63 flows into the open area axially above the inner fin portions 65. The axial height H2 of the inner fin portions 65 being substantially less than the axial height H1 makes it possible for some of the air exiting the fin portions 63 to flow generally circumferentially relative to the fins, before flowing rearward (to the right in FIG. 2), thus reducing the overall restriction to air flow and further improving heat transfer from the outer fin portions 63.

Referring now primarily to FIGS. 2 and 4, it may be seen that a forward surface of the spider 15 defines an axial height H3 from the rearward surface 59 of the body 23. Preferably, the axial height H1 of each of the outer fin portions 63 is somewhat less than the axial height H3, but not enough to provide a major air flow path between the "top" of each fin portion 63 and the adjacent surface of the spider 15, which would in effect represent a "leak" path for air, rather than forcing the air through the fin portions 63 as described previously. On the other hand, it would not be desirable for the spider 15 to be engaging the fin portions 63, assuming normal casting tolerances for the fin heights, because of the possibility of one of the fins portions 63 extending "above" an adjacent spider mounting surface 75, and preventing the fan spider 15 from piloting properly.

Figure 6:
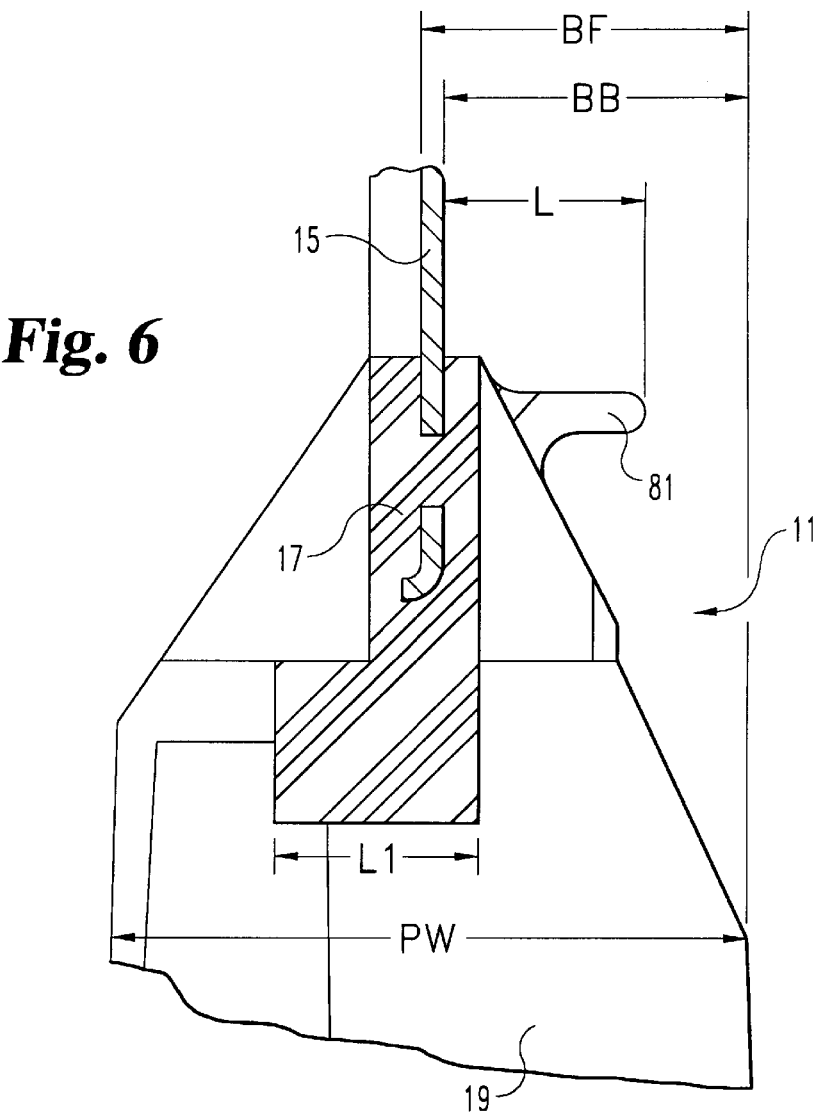
FIG. 6 is a fragmentary, axial cross-section through the cooling fan, illustrating one additional aspect of the present invention.

Referring now primarily to FIGS. 2 and 6, the annular plastic hub portion 17 includes a rearward, axially extending air dam portion 81, preferably molded integrally with the hub portion 17. Although the present invention is not limited to any particular radial location of the air dam portion 81, it is preferably located radially inward of the fan blades 19. As was mentioned in the BACKGROUND OF THE DISCLOSURE, one important aspect of the present invention is to design the fan 11 and the fluid coupling 13 as a package, and the provision of the air dam portion 81 is another example of that design approach. It has been determined, during the development of the present invention, that the presence of the axially extending air dam portion 81 is beneficial in increasing heat dissipation from the body 23, indicating that the air dam portion 81 improves the flow of cooling air over the cooling fins 61. This improvement is illustrated in FIG. 5B, wherein it may be observed that the air flow velocity radially inward from the air dam portion 81 is extremely low, which is believed to be related to the observable improvement in air flow velocity both through the body cooling fins and through the fan blades.

Referring now primarily to FIG. 6, a significant dimension of the fan is the PW (projected width) of the fan blade 19, i.e., the width the blade appears when viewed in the circumferential direction, rather than when viewed in the "normal" direction, relative to the blade. In FIG. 6, there is also illustrated a dimension referred to as "BF" (i.e., the distance from the back of the blade PW to the front surface of the spider, the surface to be attached to the mounting portions). Then there is a dimension referred to as "BB" (i.e., the distance from the back of the blade PW to the back surface of the spider, or BF minus the thickness of the spider). The air dam portion 81 defines an axial length L, measured from the rear surface of the spider. It should be understood that the measurement of the length L is not necessarily extremely precise. During the development of the subject embodiment, it was determined that, as the length L of the portion 81 is varied, the heat dissipation from the body 23 is maximized when the length L is in the range of about 60% to about 70% of the back-to-back dimension BB.

Referring still primarily to FIG. 6, it should be noted that the hub portion 17 is fairly short, in the axial direction, and is much shorter in the axial direction than PW, the projected width of the fan blades 19. It is believed that the more conventional, wider hub portion has the effect of restricting the radial flow of air. In connection with the development of the subject embodiment, it has been observed that, although the air dam portion 81 limits radial air flow, and thereby improves heat dissipation, the elimination of a major part of the axial length of the hub portion also improves heat dissipation. It is believed that, with a rear mounted fan as shown herein, reducing the axial length of the hub portion, forward of the spider, improves the radial inward air flow over the cooling fins 61, as is shown in FIG. 5B. On the other hand, and as explained previously, restricting radial air flow on the rearward side of the spider has been found to help the radial flow of cooling air over the fins 61.

Figure 7:
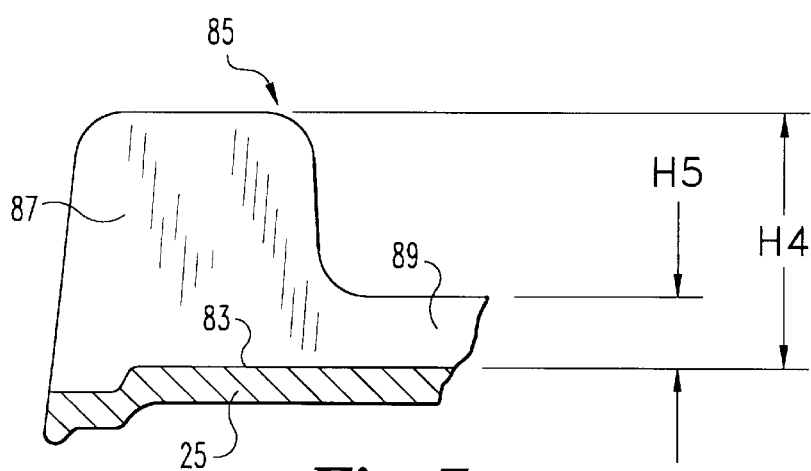
FIG. 7 is a somewhat schematic, fragmentary view of a portion of the cover, illustrating another aspect of the present invention.

Referring again primarily to FIGS. 1 and 2, but also to FIG. 7, it may be seen that the cover 25 defines a forward surface 83 and a plurality of cooling fins, generally designated 85, preferably cast integrally with the cover 25. Each of the cooling fins 85 includes a radially outer fin portion 87 and a radially inner fin portion 89. In a manner generally similar to that described for the body 23, each of the outer fin portions 87 defines an axial height H4, measured axially from the forward surface 83, and each of the inner fin portions 89 has an axial height H5, the height H4 being substantially greater than the height H5. The higher, radially outer fin portions 87 are disposed immediately forward of the land and groove area 55,57, and therefore, for the same reasons described in connection with the fins 61, the fin portions 87 are much higher to achieve much greater heat dissipation, exactly where it is needed.

In accordance with another feature of the invention, and to further improve the heat dissipation of the fin portions 87, an annular plate-like member 91 is provided in engagement with the tip portions of the fin portions 87. Preferably, the plate-like member 91 is relatively thin, perhaps even being thin enough to be somewhat deformable upon assembly, wherein the member 91 may simply be pressed into an annular channel 93 formed in the tips of the fin portions 87 Preferably, the annular channel 93 would be used "as cast", so that the feature would be essentially "free" in terms of manufacturing expense. It is believed that the presence of the annular member 91 has the effect of directing air flow through the cooling fins 85, and more specifically, constraining air flow within the fin portions 87, thereby maximizing heat transfer from the fin portions in much the same way as the spider 15 does in connection with the cooling fins 61. This aspect of the invention is also illustrated in the air flow diagram of FIG. 5B.

Figure 8:
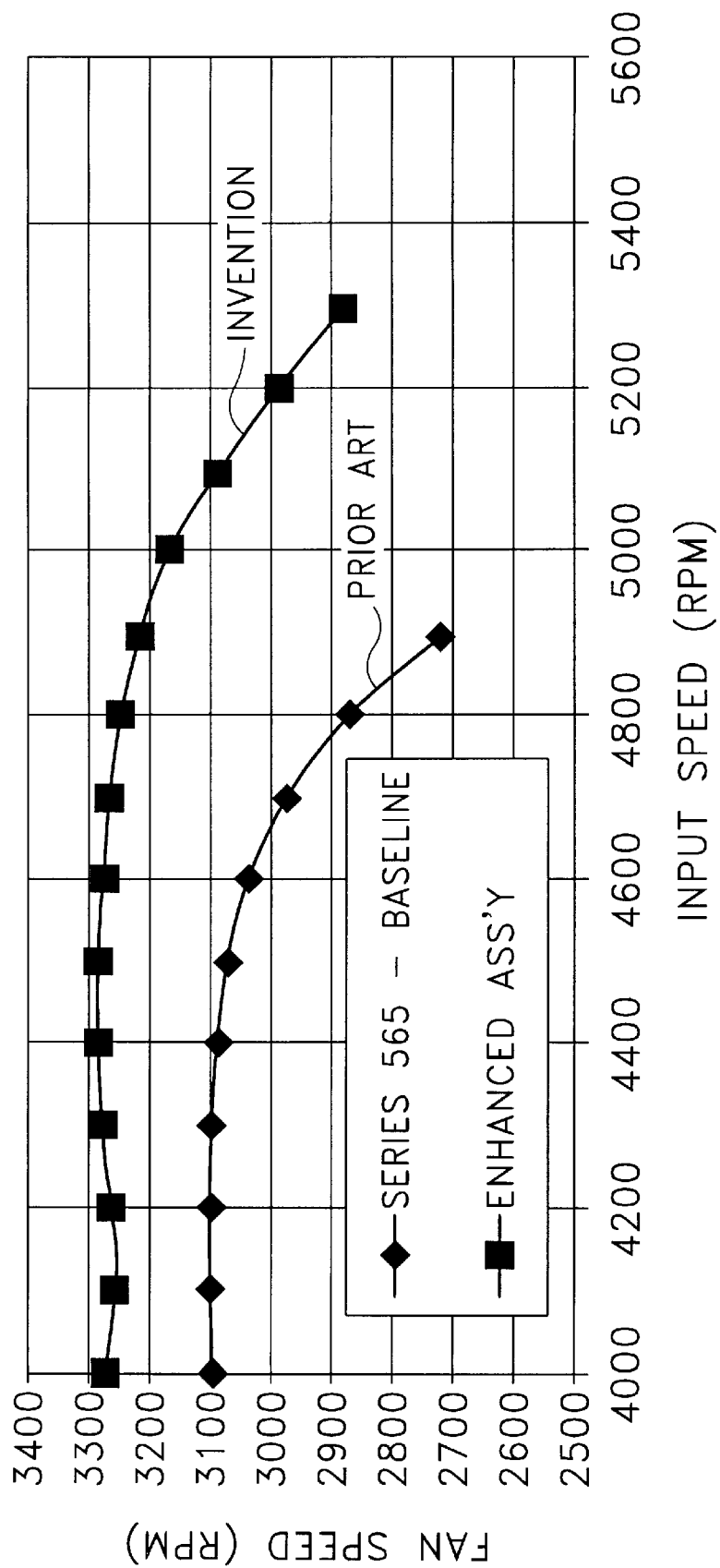
FIG. 8 is a graph of Fan Speed (in RPM) versus Input Speed (in RPM), comparing the Prior Art (Baseline) coupling device and the Enhanced assembly of the present invention.

In connection with the development and testing of the present invention, it has been determined that each of the individual features, illustrated and described herein, contributes positively to the heat dissipation of the fan and fan drive assembly. In addition, the individual features have been "optimized" so that the overall fan and fan drive assembly achieves the nearly optimum heat dissipation. This improvement is illustrated in the graph of FIG. 8, which is a graph of Fan Speed (in RPM) versus Input Speed (also in RPM). The graph labeled "PRIOR ART" represents what was considered a "baseline" unit, which was the Series 565 fan drive assembly, sold commercially by the assignee of the present invention. The graph labeled "INVENTION" represents the identical fan and fan drive assembly, except for the various features illustrated and described herein.

In conducting the testing shown in the graph of FIG. 8, each of seven fan drive assemblies received a continuous input speed of 4000 RPM (and at a constant elevated temperature of the surrounding air), initially, and then the input speed was increased to 4100 RPM for about half an hour. Then the input speed was dropped back down to 4000 RPM for a brief "rest period", after which the input speed was increased to 4200 RPM. This process of alternating rest periods (at 4000 RPM) and increasing input speeds was repeated until each fan drive assembly "deteriorated" in its performance to the point at which its output speed (Fan Speed) had "drooped" or decreased ten percent from the initial fan speed, during a rest period.

Several observations may be made about the performance of the present invention, and the results of the substantially improved heat dissipation resulting from the invention (enhanced assembly). First, the average fan speed for the enhanced assembly was at least about 150 RPM higher than for the baseline assembly, even before droop occurred, i.e., from the initial 4000 RPM input speed until the input speed reached about 4600 RPM. Secondly, for the baseline assembly, droop occurred at 4900 RPM, i.e., above that input speed, performance of the assembly would not be considered acceptable. In the case of the invention, the droop did not occur until the input speed reached about 5300 RPM, and even then the assembly of the present invention still was capable of providing a fan speed of nearly 2900 RPM whereas, when the baseline unit drooped at 4900 RPM input speed, its fan speed was already down to just over 2700 RPM. As is well known to those skilled in the art, it is important to keep the viscous fluid relatively cooler, because the viscosity then remains at a higher level, which accounts for the increased fan speed for a given input speed. Thus, the empirical data showing the higher fan speed for any given input speed tends to prove the hypothesis above that the present invention results in substantially greater heat dissipation, i.e., the viscous fluid remains cooler.

Another advantage of the invention relates to the number of cooling fins 61 (see FIG. 3). As a result of the improved air flow over the body cooling fins 61, it has been determined as part of the development of the subject embodiment that the number of fins 61 can be decreased, from over 60 to only 42, without a loss of heat dissipation. The reduction in the number of fins made it possible to improve the integrity of the body die casting, and at the same time, reduce the overall weight of the body.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A fan drive assembly of the type comprising a cooling fan attached to a fluid coupling device, said cooling fan comprising a fan hub, a spider portion and a plurality of fan blades extending radially from said fan hub; said fluid coupling device comprising a rotatable coupling member disposed in said fluid chamber for rotation relative to said coupling assembly; said coupling assembly and said coupling member cooperating to define a viscous shear chamber therebetween, whereby torque may be transmitted from said coupling member to said coupling assembly in response to the presence of viscous fluid in said viscous shear chamber; said body member including a plurality of cooling fins and a plurality of mounting portions, said spider portion being attached to said mounting portions and defining a pilot diameter; characterized by:

(a) each of said plurality of mounting portions being disposed immediately adjacent an outer periphery of said body member;

(b) each of said mounting portions defining a machining chucking surface, and a spider mounting surface on a rearward face thereof, said spider mounting surface including a radially disposed pilot surface in engagement with said pilot diameter of said spider portion; and (c) said plurality of cooling fins covering substantially all of said rearward surface of said body member not covered by said mounting portions.

2. A fan drive assembly as claimed in claim 1, characterized by said plurality of mounting portions comprising only three mounting portions, and said assembly further comprising a plurality of fastening means for attaching said spider portion of said cooling fan to said three mounting portions.

3. A fan drive assembly as claimed in claim 2, characterized by said spider portion defining a flat, sheet-like member, each of said mounting portions defining an internally-threaded bore, and each of said fastening means comprises an externally-threaded bolt.

4. A fan drive assembly as claimed in claim 2, characterized by said spider portion comprising a metal stamping, and said fan hub and said plurality of fan blades comprising a single, integral plastic molding molded about a portion of said metal stamping.

5. A fan drive assembly as claimed in claim 1, characterized by said body member defining an outside diameter, and said machining chucking surface being disposed on an outer periphery of said mounting portions and defining a diameter which is at least about 90% of said outside diameter but less than said outside diameter.

6. A fan drive assembly as claimed in claim 5, characterized by said spider portion pilot diameter and said pilot surface defined by said mounting portions defining a diameter which is from about 53% of said outside diameter to about 83% of said outside diameter.

7. A fan drive assembly as claimed in claim 1, characterized by each of said plurality of cooling fins on said body member including a radially outer fin portion, and a radially inner fin portion, said radially outer fin portion having a substantially constant first axial height, and said radially inner fin portion having a substantially constant second axial height, said first axial height being substantially greater than said second axial height, whereby restriction of air flow in the circumferential direction in the region of said inner fin portions is reduced.

8. A fan drive assembly as claimed in claim 7, characterized by said spider mounting surface defining a third axial height from said rearward surface, and said first axial height of each of said radially outer fin portions being slightly less than said third axial height, whereby said spider portion maintains radial air flow through said radially outer fin portions.

\* \* \* \* \*